(12) United States Patent
Zollner et al.

(10) Patent No.: US 7,935,383 B2
(45) Date of Patent: May 3, 2011

(54) METHOD FOR PRODUCING ADHESIVE STRIPS FOR ASSEMBLY, ESPECIALLY FORMED WITH THREE LAYERS AND BASED ON THERMALLY CROSS-LINKED, VISCOELASTIC ACRYLATE HOT-MELT ADHESIVES

(75) Inventors: Stephan Zollner, Buchholz/Nordheide (DE); Sven Hansen, Hamburg (DE); Kay Brandes, Kaltenkirchen-Moorkaten (DE); Jorg Speer, Wrist (DE)

(73) Assignee: tesa SE, Hamburg (DE)

( * ) Notice: Subject to any disclaimer, the term of this patent is extended or adjusted under 35 U.S.C. 154(b) by 118 days.

(21) Appl. No.: 11/572,959

(22) PCT Filed: Sep. 9, 2005

(86) PCT No.: PCT/EP2005/054508
§ 371 (c)(1),
(2), (4) Date: Oct. 3, 2007

(87) PCT Pub. No.: WO2006/027389
PCT Pub. Date: Mar. 16, 2006

(65) Prior Publication Data
US 2008/0118751 A1   May 22, 2008

(30) Foreign Application Priority Data
Sep. 9, 2004 (DE) .......................... 10 2004 044 086

(51) Int. Cl.
*B05D 5/10* (2006.01)
(52) U.S. Cl. .................... 427/207.1; 428/35.7; 428/343; 428/354; 428/500; 430/270.1; 430/280.1

(58) Field of Classification Search ............... 427/207.1; 428/35.7, 343, 354, 500; 430/270.1, 280.1
See application file for complete search history.

(56) References Cited

U.S. PATENT DOCUMENTS
| 4,181,752 | A | 1/1980 | Martens et al. |
| 4,330,590 | A | 5/1982 | Vesley |

(Continued)

FOREIGN PATENT DOCUMENTS
DE    40 29 896    6/1991

(Continued)

OTHER PUBLICATIONS

T.G. Fox, Bull. Am. Phys. Soc. 1 (1956) 123.

*Primary Examiner* — Michael Kornakov
*Assistant Examiner* — Xiao Zhao
(74) *Attorney, Agent, or Firm* — Norris McLaughlin & Marcus PA (57) ABSTRACT

A method of producing an adhesive tape having at least one carrier layer and two outer adhesive layers, wherein the carrier layer is from 300 μm to 5000 μm thick and is composed of a photoinitiator-free homogeneously thermally crosslinked polymer based on acrylate and/or methacrylate, in which at least one trimerized isocyanate crosslinker is added in the melt to a polyacrylate copolymer having primary hydroxyl groups and based on acrylic esters and/or methacrylic ester, a layer of the polyacrylate together with the crosslinker is conveyed to a coating unit, where pressure-sensitive adhesive layers are laminated onto both sides of the not-yet fully-crosslinked polyacrylate layer, and the crosslinking of the polyacrylate leads to a homogeneously crosslinked carrier layer.

12 Claims, 3 Drawing Sheets

U.S. PATENT DOCUMENTS

| | | | |
|---|---|---|---|
| 5,096,777 A | 3/1992 | Schacht et al. | |
| 5,767,210 A | 6/1998 | Lecomte et al. | |
| 5,789,487 A | 8/1998 | Matyjaszewski et al. | |
| 5,811,500 A | 9/1998 | Dubois et al. | |
| 5,854,364 A | 12/1998 | Senninger et al. | |
| 5,945,491 A | 8/1999 | Matyjaszewski et al. | |
| 6,114,482 A | 9/2000 | Senninger et al. | |
| 6,527,899 B1 * | 3/2003 | Dietz et al. | 156/244.11 |
| 6,677,000 B2 | 1/2004 | Neuhaus-Steinmetz et al. | |
| 6,753,079 B2 | 6/2004 | Husemann et al. | |
| 6,765,078 B2 | 7/2004 | Husemann et al. | |
| 6,881,442 B2 | 4/2005 | Husemann et al. | |
| 6,958,186 B2 | 10/2005 | Husemann et al. | |
| 6,991,828 B2 | 1/2006 | Husemann et al. | |
| 7,005,482 B2 | 2/2006 | Guse et al. | |
| 7,084,185 B2 | 8/2006 | Husemann et al. | |
| 2001/0024764 A1 * | 9/2001 | Husemann et al. | 430/270.1 |
| 2003/0017332 A1 | 1/2003 | Takizawa et al. | |
| 2004/0092685 A1 | 5/2004 | Husemann et al. | |
| 2005/0064181 A1 * | 3/2005 | Blank et al. | 428/354 |

FOREIGN PATENT DOCUMENTS

| | | |
|---|---|---|
| DE | 43 03 183 C | 7/1994 |
| DE | 198 46 902 | 5/2000 |
| DE | 10029554 | 1/2002 |
| DE | 10036901 | 4/2002 |
| DE | 10106630 | 8/2002 |
| DE | 101 63 545 | 7/2003 |
| DE | 102 21 402 | 11/2003 |
| DE | 10145229 | 8/2004 |
| EP | 0 084 220 | 7/1983 |
| EP | 0 202 938 | 11/1986 |
| EP | 0 277 426 | 8/1988 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1088871 | 4/2001 |
| EP | 1 308 492 | 5/2003 |
| EP | 1 361 260 | 11/2003 |
| WO | WO 2005/021671 | 3/2005 |

* cited by examiner

METHOD FOR PRODUCING ADHESIVE STRIPS FOR ASSEMBLY, ESPECIALLY FORMED WITH THREE LAYERS AND BASED ON THERMALLY CROSS-LINKED, VISCOELASTIC ACRYLATE HOT-MELT ADHESIVES

This is a 371 of PCT/EP2005/054508 filed 9 Sep. 2005 (international filing date).

The invention describes a double-sided pressure-sensitive adhesive (PSA) tape, in particular a PSA tape of three-layer construction, of the kind which can be used in particular for achieving very durable bonding at high temperatures, and also a method of producing it.

BACKGROUND OF THE INVENTION

For industrial PSA tape applications it is very common to employ double-sided PSA tapes in order to join two materials to one another. A distinction is made here, depending on type, between single-layer double-sided self-adhesive tapes and multilayer double-sided self-adhesive tapes.

Single-layer double-sided self-adhesive tapes, known as transfer tapes, are constructed such that the PSA layer contains no carrier and is lined only with corresponding release materials, such as siliconized release papers or release films. Transfer tapes may be lined with release materials on one side or both sides. Often use is made of release papers or release films with different degrees of siliconization on either side, so that the transfer tape can be wound readily into a roll and then also applied readily. Adhesive transfer tapes are frequently used in order to provide any of a very wide variety of substrates with pressure-sensitive adhesion. This is accomplished, for example, by laminating the transfer tape onto the substrate. In that case the release paper remains as a liner to the PSA layer in the product.

Relatively thin transfer tapes are often produced with self-adhesive compositions from solution, whereas thicker transfer tapes are produced with self-adhesive compositions from the melt or by means of what is called UV polymerization. In this procedure a prepolymerized syrup composed of acrylate monomers is coated between two UV-transparent, antiadhesively coated release films and is crosslinked on the web by UV irradiation. Specifications that may be mentioned by way of example include U.S. Pat. No. 4,181,752, EP 084 220 A, EP 202 938 A, EP 277 426 A, and U.S. Pat. No. 4,330,590. A disadvantage of this technology is the often high residual monomer fraction in the self-adhesive compositions. This fraction of residual monomer is unacceptable for many applications. Transfer tapes filled with non-UV-transparent adjuvants cannot be produced in this way.

DE 43 03 183 A1 also describes a method of producing thick PSA layers, especially for producing high-performance self-adhesive articles. In said process a mixture of starting monomers which is to be polymerized by means of UV radiation is mixed, and thickened in the process, with a solvent-free, saturated photopolymerizable polymer, and then this mixture is applied to a dehesively treated carrier and exposed to UV radiation. A disadvantage is the use of copolymerized or added photoinitiators, since the layers may undergo yellowing and, in the event of UV exposure prior to use, an often marked change in the technical adhesive properties is found. In that case it is necessary to go to considerable effort and expense—by means, for example, of UV-impervious packaging—to ensure that the customer obtains a uniformly high bonding performance. Moreover, in the event of bonding on UV-transparent substrates, such as on window glass or transparent plastic surfaces, for example, there is a risk that layers containing photoinitiator will undergo aftercrosslinking. This does result initially in an increase in bond strength, but further crosslinking causes the layers to become paintlike and undergo embrittlement. Sooner or later, this leads to the failure of the bond, particularly under a shearing load.

Transfer tapes may be foamed or filled in order to improve their properties, particularly for example in respect of bonding to uneven substrates. DE 40 29 896 A1 describes a carrierless, double-sided self-adhesive tape comprising a pressure-sensitive adhesive layer more than 200 µm thick which contains solid glass microballs of more than 1.5 g/cm$^3$ in density. This tape is said to exhibit particularly effective adhesion. A disadvantage is the high density as a result of the glass balls that are used.

Double-sided adhesive tapes of multilayer construction have advantages over their single-layer counterparts, since the variation of the individual layers allows specific properties to be set. For instance, a three-layer adhesive tape, consisting of a middle carrier layer and two outer layers, can be constructed symmetrically or asymmetrically. The two outer layers may each be PSA layers, or, for example, one layer may be a PSA layer and the other layer a heat-activatable adhesive. The carrier, i.e., the middle layer, may for example be a film, a nonwoven, a "non-woven" material or a foam film carrier. Foam or foam like carriers are often used when there is a requirement for high bond strength to uneven surfaces or when distances are to be compensated.

For instance, for adhesive assembly tapes, use is often made of closed-celled foam carriers based on PE (polyethylene), PU (polyurethane) or EVA (ethyl-vinyl acetate), which have a double-faced coating of synthetic rubber PSA or acrylate PSA. Applications, listed by way of example, are the bonding of mirrors, trim strips and emblems in automotive construction, further uses in automobile construction, and also use in the furniture industry or in household appliances.

Assembly tapes for the exterior sector generally possess PSAs based on polyacrylate. This material is particularly weathering-resistant and very long-lived, and is virtually inert toward UV light and toward degradation by oxidation or ozonolysis.

Also known are adhesive assembly tapes with middle layers of rubber, styrene block copolymers, and polyurethane. All of these materials fail to possess the same good aging and thermal stability properties of polyacrylate. Systems based on acrylate block copolymers are resistant to aging but are not sufficiently heat-resistant for high-performance requirements, since these systems are crosslinked only physically by way of styrene or methyl methacrylate domains. When the softening temperature of the domains is reached (as in the case of styrene block copolymers), the PSAs soften. Consequently, the bond fails.

Another disadvantage of typical foam adhesive tapes is that they can easily split. If, for example, PE foam is used, this material softens on heating to about 100° C., and the bond fails. Double-sided assembly tapes of this kind are unsuitable for high-grade applications. Foams based on PU are indeed more temperature-stable, but have a tendency to yellow under UV and sunlight exposure. They too are often unsuitable for high-performance applications.

For a number of years there have been double-sided adhesive tapes available which are of three-layer construction with an acrylate core. This viscoelastic acrylate core is foamlike. Its foamlike structure is achieved through the admixture of hollow glass or polymer balls to the acrylate composition, or else the acrylate composition is foamed by means of expandable polymeric "microballoons". Provided adjacent to this viscoelastic layer are in each case PSAs, based in the majority of cases likewise on acrylate, rarely on synthetic rubber, or else in special cases on heat-activatable adhesive layers. The advantages of the viscoelastic acrylate core arise on the one hand from the physical properties of the polyacrylate (which, as already mentioned, are a particular weathering stability and long life, and substantially inert behavior toward UV light and toward degradation by oxidation or ozonolysis). As a result of the design of the acrylate core layer, determined for example by the comonomer composition, nature and proportion of certain fillers, and the degree of crosslinking, these products are especially suitable for bonding articles to substrates having uneven surfaces. Depending on the choice of PSA, a broad spectrum of properties and bond strengths can be covered.

Nevertheless, as a result of their preparation, the aforementioned systems have critical disadvantages. The viscoelastic acrylate core layer is prepared by a process of two-stage UV polymerization. In the first step of that process a mixture based on acrylate monomers, 10% by weight acrylic acid and 90% by weight isooctyl acrylate for example, is prepolymerized to a conversion of approximately 10%-20% by UV irradiation in a reactor in the presence of a photoinitiator. Alternatively, this "acrylic syrup" can also be obtained by thermally initiated free radical polymerization. In the second step this acrylic syrup, often after further photoinitiator, fillers, hollow glass balls, and crosslinker have been added, is coated between antiadhesively coated UV-transparent films, and is polymerized to a higher degree of conversion on the web, by means of repeated UV irradiation, and in the course of this polymerization it is crosslinked. The completed three-layer product is obtained, for example, after the PSA layers have been laminated on.

The production of "relatively thick" viscoelastic layers in particular must in many cases be carried out in the absence of oxygen. In that case the composition is protected by a lining of film material, and UV initiation takes place through the films. PE and PP films which are sometimes used for this purpose deform under the conditions of crosslinking reaction (in the case of UV-initiated polymerization, heat of reaction is liberated, and can cause deformation of non-temperature-resistant film) and are therefore poorly suited. UV-transparent films such as PET are more thermally stable; in this case, however, it is necessary to add to the composition a photoinitiator which reacts to longwave radiation, in order for the reaction to take place. As a consequence of this, these layers have a tendency to undergo aftercrosslinking under UV light or sunlight. This process negates the advantage specific to the polyacrylate as a material. A further disadvantage is that fillers not transparent to UV cannot be used. Moreover, as a result of the process, there remains a high residual monomer fraction in these products. Possible reduction of residual monomer through a reduction in coating speed or through intensive subsequent drying is not very economic. The maximum achievable layer thickness is very heavily dependent on the wavelength of the photoinitiator used. Layers can be produced of up to about 1 mm, albeit with the disadvantages specified above. Layers any thicker than this are virtually impossible to obtain.

A particular disadvantage in the case of acrylate layers produced by two-stage UV polymerization, UV crosslinking or electron beam treatment is a more or less strongly pronounced profile of crosslinking through the layer. Toward the irradiation source, the UV-crosslinked layer is always more strongly crosslinked than on the side opposite the UV radiation source. The degree of the crosslinking profile is dependent for example on the layer thickness, on the wavelength of the photoinitiator that is used, and also on the wavelength of the radiation emitted by the UV radiation source.

Specifications DE 198 46 902 A1 and DE 101 63 545 A1 propose using EBC (electron beam) irradiation or UV irradiation from both sides in order to lower the resulting crosslinking profile and to provide virtually homogeneous crosslinking of thick UV-crosslinkable acrylate PSA layers in particular. However, the layers produced in this way still have a crosslinking profile, and, moreover, the process is very costly and inconvenient. Moreover, it would be virtually impossible to use in order to produce viscoelastic acrylate carriers; instead, the preparation of PSA layers in particular is described.

A disadvantage of viscoelastic acrylate carriers which exhibit a profile of crosslinking through the layer is their inadequate capacity for distributing stresses in a uniform way. One side is always either overcrosslinked or undercrosslinked. An exact balance can never be struck between adhesive and cohesive properties for the entire layer, but instead only for a small section.

EBC-crosslinked layers as well always exhibit a profile of crosslinking in accordance with the layer thickness and the material. With EBC-crosslinked layers as well it is impossible to set the crosslinking exactly. Nevertheless, EBC crosslinking proceeds without added photoinitiators, thereby removing some, although not all, of the disadvantages associated with the UV-irradiated layers. Depending on the accelerator voltage and on the thickness of the material to be irradiated, it is possible to vary the thickness of the irradiated layer. Layers above about 500 µm in thickness, particularly if filled with inorganic fillers such as glass balls, for example, can no longer be economically irradiated. Here, therefore, there is an upper limit on the layer thicknesses that are achievable.

SUMMARY OF THE INVENTION

It is an object of the invention, accordingly, to provide an adhesive tape which comprises an acrylate-based viscoelastic carrier layer which no longer has the above-mentioned disadvantages and which instead is notable for good technical adhesive properties and very good anchoring of the layers to one another and which can be utilized in particular as an adhesive assembly tape. The adhesive tape ought to possess consistent properties through the carrier layer; in other words, in particular, it ought not to exhibit any profile of crosslinking.

DETAILED DESCRIPTION

In accordance with the invention this object is achieved by means of a double-sided adhesive tape having at least one carrier layer and two adhesive layers, the carrier layer being composed of a photoinitiator-free, homogeneously crosslinked polyacrylate, which thus exhibits no profile of crosslinking through the layer.

The crosslinked, polyacrylate-based carrier layer is in particular a carrier layer which is viscoelastic, i.e., which shows flow behavior on a substrate, and at the same time possesses at least partly elastic properties.

One preferred embodiment of the invention is given by a three-layer adhesive tape which comprises as its viscoelastic carrier a photoinitiator-free, homogeneously thermally crosslinked acrylate hotmelt which at least on one side, in particular on both sides, is covered with a pretreated, preferably corona-pretreated adhesive. With particular preference the carrier layer is joined to the adhesive layers by means of chemical reaction.

Between the carrier layer and one or both adhesive layers there may in each case be a barrier layer, particularly in order to prevent any migration of additives or chemical compounds.

With different advantageous embodiments of the adhesive tape it is also possible for the features of the individual embodiments of the invention to be combined with one another.

Figure 1:
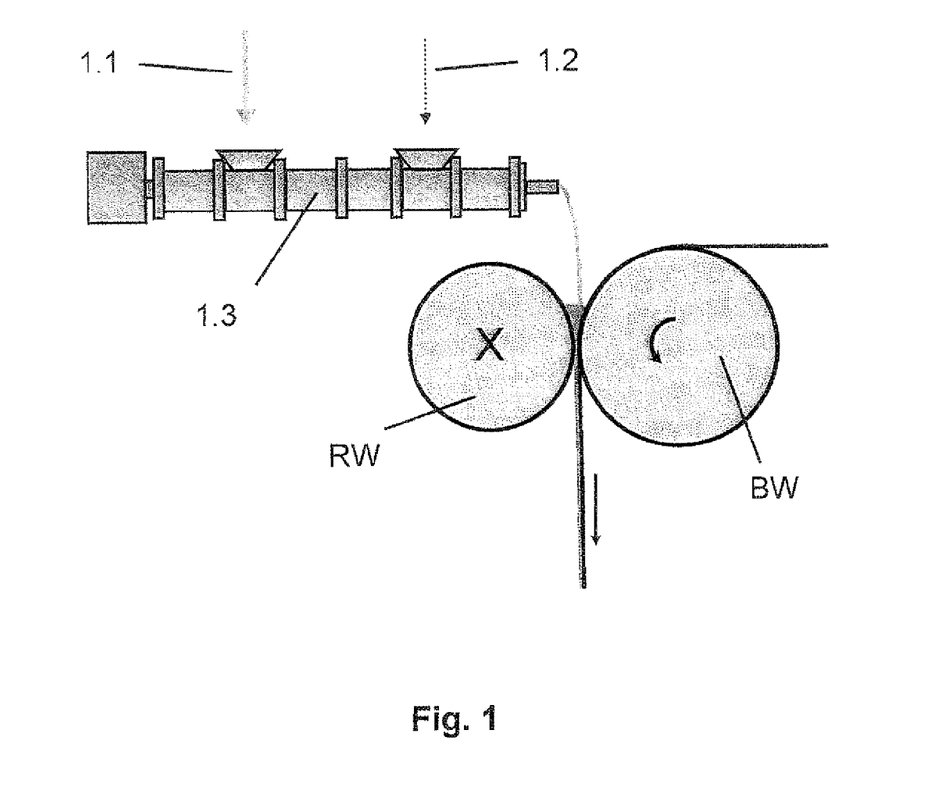
FIG. 1 is a diagrammatic representation of the process for producing the adhesive tape of the invention.

The adhesive tape of the invention, i.e., in particular, the three-layer adhesive assembly tape with a homogeneously crosslinked viscoelastic polyacrylate carrier, is advantageously obtained by the method described in the following text: At least one thermal crosslinker is added in the melt, preferably under precise temperature and time control, to a polyacrylate copolymer (referred to simply below as "polyacrylate") based on acrylic esters and/or methacrylic esters. The polyacrylate together with the crosslinker is conveyed to a coating unit, more preferably with an extruder, more preferably still with a compounding extruder in which the crosslinker has already been added and in which, where appropriate, the concentration of the polyacrylate has already taken place; in this regard, compare the diagrammatic representation in FIG. 1, where the numbers and symbols have the following definitions: 1.1 polyacrylate feed, 1.2: addition of crosslinker, 1.3: extruder, RW: doctor roll; BW: coating roll. In or after this coating unit the material is introduced between two adhesive layers each of which has been pretreated, preferably corona-pretreated, and has been coated two-dimensionally onto a carrier material (also referred to as a liner; particularly siliconized release film or release paper). Preference is given to coating and lamination by means of double-roll, multiroll or nozzle coating, very preferably with the coating unit illustrated later on below.

The crosslinking of the polyacrylate introduced in this way takes place in the layer, and in particular the thermal crosslinkers which have been added to the polyacrylate react with the pretreated boundary layer. In this case there is a chemical attachment of the adhesives to the resultant viscoelastic carrier layer. This provides for effective anchoring of carrier material (polyacrylate) and adhesive layers.

The time after the crosslinking system has been metered in the compounding assembly up until the polyacrylate composition that forms the carrier is shaped between the adhesives, particularly between the adhesives coated on liners, is referred to as the processing time. Within this time, the viscoelastic carrier layer, which is now undergoing crosslinking, can be coated gel-free with an optically good coating pattern. Crosslinking then takes place primarily after coating on the web under mild conditions, which are harmful neither to carrier nor to liner; in other words, with particular advantage, without the influence of actinic radiation such as additional UV irradiation or electron beams. This produces a homogeneously crosslinked layer, in other words one which does not exhibit a profile of crosslinking through the layer.

The base composition used for the carrier layer, in particular for the viscoelastic carrier layer, comprises polyacrylates, which are polymers based at least partly on acrylic esters and/or methacrylic esters.

With preference in accordance with the invention a portion of the acrylic esters and/or methacrylic esters contains primary hydroxyl groups. In a preferred procedure the fraction of the acrylic and/or methacrylic esters containing primary hydroxyl groups is up to 25% by weight, based on the polyacrylate.

It may also be of advantage if the polyacrylate includes some copolymerized acrylic acid.

For the method of the invention for producing the adhesive tape, as a basis for the viscoelastic carrier, it is preferred to use a polyacrylate which can be traced back to the following reactant mixture:

a1) acrylic esters and/or methacrylic esters of the following formula where $R^I$=H or $CH_3$ and $R^{II}$ is an alkyl chain having 1 to 20 C atoms, with a fraction of 65%-99% by weight, a2) acrylates and/or methacrylates whose alcohol component contains at least one primary hydroxyl group, and/or vinyl compounds which are copolymerizable with acrylates and contain at least one primary hydroxyl group, with a fraction of 1% to 20% by weight, a3) and, if the fractions of a1) and a2) do not add up to 100% by weight, olefinically unsaturated monomers containing functional groups, with a fraction of 0% to 15% by weight.

The monomers are preferably chosen such that the resulting polymers have a glass transition temperature of –40° C. to +80° C., understood to be a dynamic glass transition temperature for amorphous systems and to be the melting temperature for semicrystalline systems, and being determinable by means of dynamechanical analysis (DMA) at low frequencies.

In order to obtain a correspondingly preferred polymer glass transition temperature, $T_g$, of –40 to +80° C., and in accordance with the above remarks, the monomers are very preferably selected, and the quantitative composition of the monomer mixture advantageously chosen, in such a way as to result in the desired $T_g$ value for the polymer in accordance with an equation G1 in an analogy to the Fox equation (cf. T. G. Fox, Bull. Am. Phys. Soc. 1 (1956) 123).

$$\frac{1}{T_g} = \sum_n \frac{w_n}{T_{g,n}} \tag{G1}$$

In this equation, n represents the serial number of the monomers used, $w_n$ the mass fraction of the respective monomer n (% by weight), and $T_{g,n}$ the respective glass transition temperature of the homopolymer of the respective monomer n, in K.

With great preference use is made for a1) of acrylic or methacrylic monomers which are composed of acrylic and methacrylic esters having alkyl groups of 1 to 20 C atoms, preferably 4 to 9 C atoms. Specific examples, without wishing to be restricted by this recitation, are methacrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, such as isobutyl acrylate, 2-ethylhexyl acrylate, 2-ethylhexyl methacrylate, isooctyl acrylate, and isooctyl methacrylate, for example. Further classes of compound to be used for a1) are monofunctional acrylates and/or methacrylates of bridged cycloalkyl alcohols, composed of at least 6 C atoms. The cycloalkyl alcohols may also be substituted, as for example by C-1-6 alkyl groups, halogen atoms or cyano groups. Specific examples are cyclohexyl methacrylates, isobornyl acrylate, isobornyl methacrylates and 3,5-dimethyladamantyl acrylate.

Great preference is given to using, for a2), monomers which contain hydroxyl groups, very preferably primary hydroxyl groups. Examples of a2) are hydroxyethyl acrylate, hydroxyethyl methacrylate, hydroxypropyl acrylate, hydroxypropyl methacrylate, 6-hydroxyhexyl methacrylate, 4-hydroxystyrene, and ally alcohol, this recitation not being conclusive.

Monomers for a3) are, for example, olefinically unsaturated monomers having functional groups such as carboxylic acid groups, acid anhydride groups, phosphonic acid groups, amide or imide or amino groups, isocyanate groups, epoxy groups or thiol groups. Examples of a3) are acrylic acid or methacrylic acid, maleic anhydride, itaconic anhydride, itaconic acid, glyceridyl methacrylate, glyceryl methacrylate, vinyl acetic acid, β-acryloyloxypropionic acid, trichloroacrylic acid, fumaric acid, crotonic acid, aconitic acid, acrylonitrile dimethylacrylic acid, N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(buthoxymethyl)methacrylamide, N-methylolacrylamide, N-(ethoxymethyl)acrylamide, and N-isopropylacrylamide, this recitation not being conclusive.

As further hardening comonomers it is possible for macromonomers to have been copolymerized into the polyacrylate. Particularly suitable macromonomers are those as described in EP 1 361 260 A1, such as 2-polystyreneethyl methacrylate having a molecular weight Mw of 13 000 g/mol. The macromonomer-modified, thermally crosslinked acrylate hotmelts which result on crosslinking have a greater shear strength, owing to the fact that they are physically and thermally crosslinked.

The polyacrylates are particularly suitable for inventive further processing as carrier material if they are prepared by bulk, solution or emulsion polymerization and if desired are subsequently concentrated, particularly if they contain volatile constituents. Concentration may be carried out advantageously in a devolatizing extruder, particularly in the same way as DE 102 21 402 A1, page 3, lines 22-68.

In one preferred procedure the polyacrylates have a weight-average molecular weight $M_w$ of at least 300 000 g/mol up to a maximum of 1 500 000 g/mol. The average molecular weight is determined by size exclusion chromatography (GPC) or matrix-assisted laser desorption/ionization coupled with mass spectrometry (MALDI-MS). It can be advantageous to carry out the polymerization in the presence of regulators such as thiols, halogen compounds, and, in particular, alcohols (isopropanol), in order to set the desired weight-average molecular weight $M_w$. The polymerization time, depending on conversion and temperature, is between 2 and 72 hours.

Also particularly suitable for the inventive further processing are polyacrylates which have a narrow molecular weight distribution (polydispersity<4). These compositions have a particularly high shear strength after crosslinking for a relatively low molecular weight. Given that, in comparison to a normally distributed polyacrylate, a narrow-distribution polyacrylate needs a lower molecular weight for the same level of cohesion, there are reductions in viscosity and in operating temperatures. Hence a narrow-distribution polyacrylate allows a particularly long processing time.

Narrow-distribution polyacrylates can be prepared by anionic polymerization or by controlled free-radical polymerization methods, the latter being especially suitable. Examples are described in U.S. Pat. No. 6,765,078 B2 and DE 10036901 A1 or US 2004/0092685 A1. Atom transfer radical polymerization (ATRP) as well can be used with advantage to synthesize narrow-distribution polyacrylates, the initiator used preferably comprising monofunctional or difunctional secondary or tertiary halides and the halide or halides being abstracted using complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in specifications U.S. Pat. No. 5,945,491 A, U.S. Pat. No. 5,854,364 A, and U.S. Pat. No. 5,789,487 A.

Optionally it is also possible to add plasticizers, resins and fillers to the viscoelastic acrylate layer. Suitable fillers are hydrophilic or hydrophobic silica gels such as Aerosils or Ultrasils, inorganic fillers such as chalk, titanium dioxide, calcium sulfate and barium sulfate, and organic fillers such as polymer beads or fibers based on cellulose, polyethylene, polypropylene, polyamide, polyacrylonitrile, polyester, polymethacrylate and/or polyacrylate.

In addition it is possible for fillers of low flammability, such as ammonium polyphosphate, for example, and also electrically conductive fillers, such as conductive carbon black, carbon fibers and/or silver-coated beads, for example, and also ferromagnetic additives, such as iron(III) oxides, for example, and also additives for producing foamed layers, such as expandants, for example, solid glass balls, hollow glass balls, expandable microballoons, aging inhibitors, light stabilizers and/or ozone protectants to be added or incorporated by compounding into the polyacrylate before or after the latter has been concentrated.

Optionally it is possible to add the typical plasticizers in concentrations up to 3% by weight. Examples of plasticizers which can be metered in include low molecular mass polyacrylates, phthalates, water-soluble plasticizers, plasticizer resins, phosphates or polyphosphates.

The additives can be added before or after the polyacrylate has been concentrated.

To produce thick carrier layers it is possible for these layers to be additionally filled and/or foamed. For these purposes the polyacrylate is admixed with solid glass balls, hollow glass balls or expanding microballoons, preferably before the thermal crosslinker is added.

In accordance with the invention a thermal crosslinker is added to the polyacrylate. In one very advantageous embodiment the added thermal crosslinker is an isocyanate, preferably a trimerized isocyanate. With particular preference the trimerized isocyanates are aliphatic or amine-deactivated isocyanates.

Suitable isocyanates are, in particular, trimerized derivatives of MDI [4,4-methylenedi(phenyl isocyanate)], HDI [hexamethylene diisocyanates, 1,6-hexylene diisocyanate] and/or IPDI [isophorone diisocyanates, 5-isocyanato-1-isocyanatomethyl-1,3,3-trimethylcyclohexane], examples being the products Desmodur® N3600 and XP2410 (each from BAYER AG: aliphatic polyisocyanates, low-viscosity HDI trimers). Also highly suitable is the surface-deactivated dispersion of micronized trimerized IPDI that is BUEJ 339®, now HF9® (BAYER AG).

Also suitable in principle for crosslinking, however, are other isocyanates, such as Desmodur VL 50 (MDI-based polyisocyanate, Bayer AG), Basonat F200WD (aliphatic polyisocyanate, BASF AG), Basonat HW100 (water-emulsifiable polyfunctional isocyanate based on HDI, BASF AG), Basonat HA 300 (allophanate-modified polyisocyanate on isocyanurate. HDI basis, BASF) or Bayhydur VPLS2150/1 (hydrophilically modified IPDI, Bayer AG), this recitation not being conclusive.

The addition of the thermal crosslinker to the polyacrylate takes place in the melt, preferably under precise temperature and time control.

The addition and incorporation of the thermally reactive crosslinking system into the polyacrylate matrix takes place preferably in continuous compounding assemblies. In accordance with the invention these assemblies are designed so that, with thorough commixing and simultaneously low introduction of shearing energy, a short residence time is ensured for the composition after the crosslinking system has been metered. The compounding assemblies are preferably extruders, especially twin-screw extruders and/or planetary roller extruders. It is particularly advantageous if the spindles of the extruder are heatable and/or coolable.

With advantage, and in order to optimize the time window of the reaction, the addition may be made in the extruder in which the polyacrylate composition has already been concentrated.

The crosslinkers are added at one or more locations in the assemblies, preferably in unpressurized zones. It is also favorable if the thermally reactive crosslinker substances are added in finely divided form to the polyacrylate, such as in the form of aerosol, in fine droplets, or in dilution in a suitable diluent such as a polymer-compatible plasticizer.

With advantage the residual monomer content of the polyacrylate for the carrier layer when the thermal crosslinker is added is not more than 1% by weight, in particular not more than 0.3% by weight, based on the polyacrylate.

With advantage the residual solvent content of the polyacrylate for the carrier layer after concentration when the thermal crosslinker is added is not more than 1% by weight, in particular not more than 0.3% by weight, based on the polyacrylate.

A preferred procedure is to use the thermal crosslinker, in particular the trimerized isocyanate, at 0.1% to 5% by weight, in particular at 0.2% to 1% by weight, based on the polyacrylate.

In one advantageous development of the method of the invention the temperature of the polyacrylate for the carrier layer when the thermal crosslinker is added is between 60° C. and 120° C., more preferably between 70° C. and 100° C.

The polyacrylate melt with the crosslinker added is transported to a coating unit, preferably directly through the extruder in which the addition of the crosslinker and, where appropriate, the concentration of the composition have already taken place. There, pretreated, especially corona-pretreated, pressure-sensitive adhesive layers are laminated onto both sides of the partly crosslinked—that is, not yet fully crosslinked—viscoelastic carrier layer. Reactive isocyanate groups in the carrier layer may react at this stage with the hydroxyl functionalities of the PSA layers laminated on. This has a beneficial effect on crosslinking. Even compositions which are otherwise very difficult to anchor can be attached in this way to the viscoelastic carrier layer.

Suitable adhesive layers of the adhesive tape of the invention comprise in principle all kinds of adhesives that can be anchored on the carrier.

With great preference in a sense of the invention use is made of pressure-sensitive adhesives (PSAs). In one preferred procedure a pretreated, especially corona-pretreated, polyacrylate layer is laminated on to both sides. It is also possible to use adhesive layers, particularly acrylate-based adhesive layers, that have been pretreated by other methods, provided that in these adhesives there are already functional groups, and/or their functional groups formed as a result of the pretreatment, that enter into chemical bonds with isocyanate groups.

Particularly preferred PSAs are all-acrylate compositions or those which contain no migratable components such as resins or plasticizers in any notable concentration.

Great preference is given in the sense of the invention to all-acrylate PSAs which have been coated beforehand onto siliconized polyester liners.

As well as PSAs, suitability is also possessed by hotmelt adhesive layers or heat-activatable layers, which are laminated preferably onto one side of the viscoelastic layer. This gives products having a asymmetric construction.

Examples of suitable base polymers for adhesives (both PSAs and other adhesives) are natural rubber, synthetic rubbers, acrylate block copolymers, styrene block copolymers, EVA, many polyolefins, polyurethanes, polyvinyl ethers, and silicones.

Preference is given to adhesives with no notable fractions of migratable constituents, and which are so highly compatible with the polyacrylate of the carrier layer that they could migrate into it in a significant amount.

Examples of PSA layers very suitable in accordance with the invention are described in EP 1 308 492 A (page 27, line 23 to page 12, line 56).

The adhesives, preferably PSAs, coated onto release material can be pretreated by all known physical or chemical methods which form reactive groups that are able to react with isocyanates. It is also possible to use all known techniques for priming, it being possible for the primer layers to be applied both from solutions or from dispersions onto the adhesive layers. Application may also take place in an extrusion or coextrusion process. Preferred physical methods are flame pretreatment, corona pretreatment, atmospheric plasma pretreatment or vacuum plasma treatment. Great preference attaches to corona pretreatment directly before the lamination of the still-reactive viscoelastic carrier layer.

In certain cases, particularly when using PSAs with migratable constituents such as styrene block copolymers or rubber, it may be sensible to use a barrier layer, made of polyamide, for example. Other materials too, however, which fulfill this purpose are allowable. Then, advantageously, in order to produce a double-sided adhesive assembly tape, either the barrier layer is applied to an adhesive which has been coated beforehand onto a release material, after which pretreatment takes place by the techniques described above on the barrier layer side, and lamination takes place to the still-reactive viscoelastic carrier layer. Alternatively the barrier layer can be applied to the viscoelastic carrier layer and then coated with the adhesive.

Directly after the operation of coating by means of roll application or extrusion die, the viscoelastic carrier layer is partially crosslinked, but not yet sufficiently crosslinked. Coating in this context means the shaping of the very substantially solvent-free carrier composition, blended with crosslinker, into corresponding layers, and application between the pretreated adhesive layers applied onto material in web form. The degree of crosslinking at this point in time, therefore, may not have advanced past a point where the processability of the PSA, in particular in respect of a good coating pattern, is no longer ensured.

The processing time is 3-30 minutes, preferably 5-20 minutes, more preferably 5-10 minutes.

Figure 2:
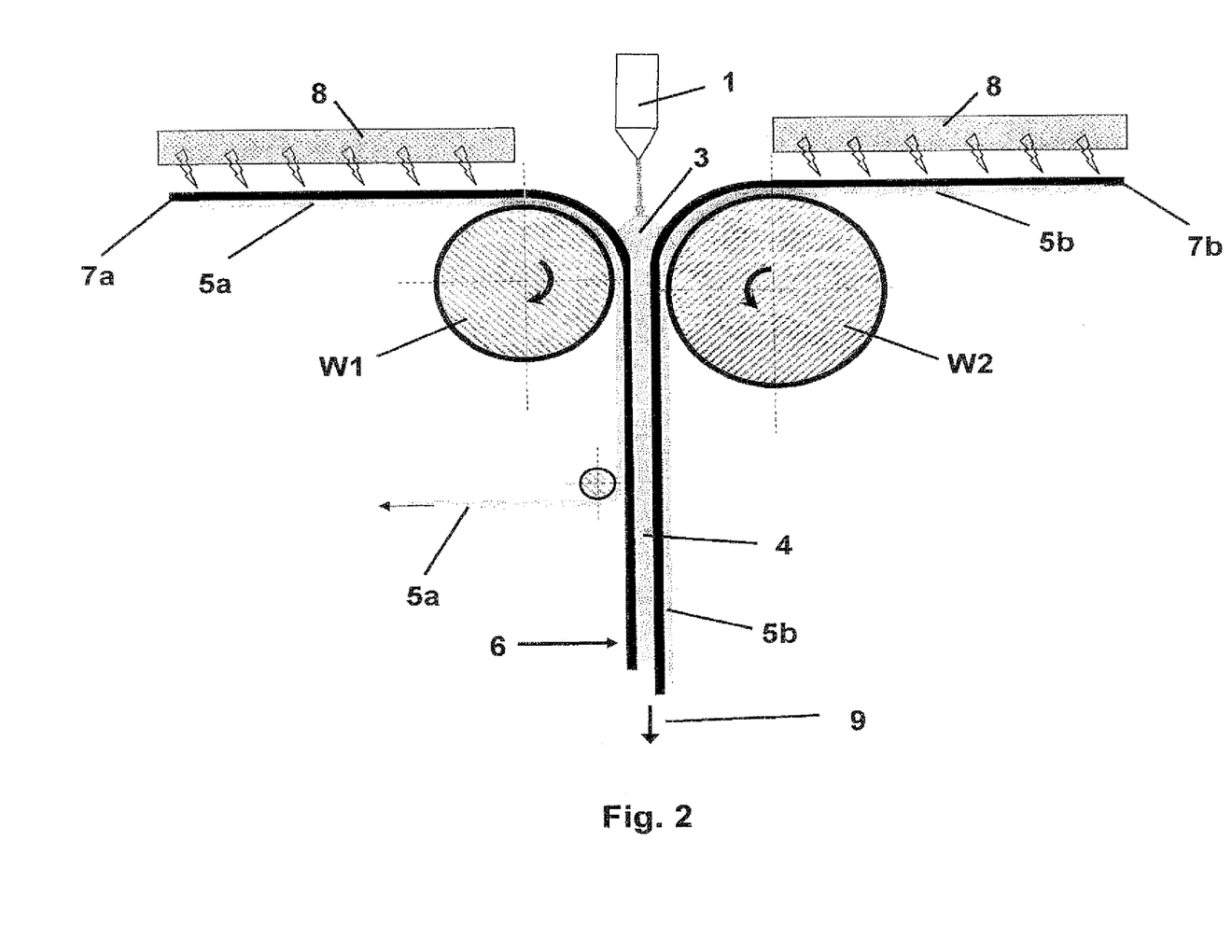
FIG. 2 illustrates the construction of the three-layer adhesive-polyacrylate carrier-adhesive system of the invention in a two-roll unit.

The construction of the three-layer adhesive-polyacrylate carrier-adhesive system takes place preferably via a two-roll unit (cf. FIG. 2). By means of a distributor nozzle (1) or other suitable unit, the viscoelastic composition (3) that forms the eventual carrier material, and which is already compounded with the crosslinker and, where appropriate, with fillers, is supplied to the roll nip where it is introduced between the two adhesive layers (6a, 6b), which have been subjected beforehand to a pretreatment, in particular a corona treatment (8) (corona conduction preferably set: 10 to 200 W min/m$^2$), preferably 30-160 W min/m$^2$, very preferably 80-120 W min/m$^2$. The adhesives, coated in particular onto antiadhesive auxiliary carriers (7a, 7b), are introduced into the apparatus via the rolls W$_1$ and W$_2$, in such a way that the adhesive sides are facing one another.

The shaping of the viscoelastic composition into a viscoelastic film takes place between the calendar rolls W$_1$ and W$_2$ in the roll nip, and at the same time there is coating with the two supplied adhesives (6a, 6b). The purpose of pretreating the adhesives, in particular within a corona station (8), is to improve the anchoring of the adhesives on the shaped, viscoelastic carrier layer. This treatment produces active OH groups on the surface of the adhesives, which after the three-layer assembly has been produced lead to improved chemical attachment to the viscoelastic carrier layer.

The width of the roll nip and the pressure of the rolls determine the layer thickness of the carrier.

The process outlined above is particularly suitable for producing viscoelastic three-layer constructions with layer thicknesses between 100 μm and 10 000 μm, preferably between 300 μm and 5000 μm, at production speeds of between 0.5 m/min and 100 m/min.

Depending on the viscoelastic compositions and antiadhesive carrier materials used, the surface temperatures of the rolls are set at preferably between 25° C. and 20° C., more preferably between 60° C. and 150° C., and very preferably between 80° C. and 120° C. Suitable surfaces for the two calendar rolls used include all of the materials that are familiar to the skilled worker, such as steel, chromium-plated steel, stainless steel, plastics, silicones, ceramics, and combinations of the stated materials.

Amazingly, and surprisingly for the skilled worker, the bead of composition rotating within the roll nip does not undergo mixing with the supplied adhesives. It would have been expected that the adhesive would be dissolved at least partly by the antiadhesively furnished carrier, and would undergo mixing with the rotating bead of composition.

The crosslinking reaction, especially with isocyanates, proceeds preferably without catalyses. In the case of functionalized acrylate copolymers that contain no copolymerized acrylic acid, the reaction proceeds preferably with aromatic and/or aliphatic isocyanates at slightly elevated temperatures. In the case of functionalized acrylate copolymers that contain copolymerized acrylic acid, the reaction rate is faster. Here an operationally stable process is accomplished preferably with the slower-reacting aliphatic isocyanates or surface-deactivated isocyanate emulsions.

Even without any heat being supplied, the crosslinking reaction proceeds to completion under standard conditions (room temperature). Generally, the crosslinking reaction with the multifunctionalized isocyanate is very largely at an end after a storage period of up to 14 days, in particular of four to ten days, and the ultimate cohesion of the composition has been reached. At the same time, as a result, the viscoelastic carrier layer attaches chemically to the outer layers of adhesive that have been laminated on.

The crosslinking with isocyanates forms urethane groups which link the polymer chains. This linkage results in an increase in the cohesion of the viscoelastic carrier layer and hence in the shear strength of the product.

The physical properties of the viscoelastic carrier and of the end product, particularly the viscosity, flow-on behavior, heat stability, and shear strength, can be influenced not only by the comonomers and, where appropriate, fillers selected but also by the degree of crosslinking, thereby allowing the end product to be optimized through an appropriate choice of the reaction conditions. Various factors determine the operational window of this process. The most important influencing variables, particularly in the case of unblended systems, are operational temperature and coating temperature, residence time in the compounding extruder and coating assembly, type of crosslinker (deactivated, aliphatic, aromatic), crosslinker concentration, fraction of hydroxyl groups in the polymer, fraction of copolymerized acid groups in the polymer, and the average molecular weight of the polyacrylate.

A number of relations are described below with regard to the preparation of the polyacrylate of the invention, these relations optimizing the production method but not being restrictive of the concept of the invention:

For a given concentration of crosslinker, an increase in the operating temperature leads to a reduced viscosity, which enhances the coatability of the viscoelastic composition but reduces the processing time. An increase in processing time is obtained by lowering the crosslinker concentration, lowering the molecular weight, lowering the concentration of hydroxyl groups in the polymer, lowering the acid fraction in the polymer, using less reactive isocyanates, and lowering the operating temperature. An improvement in the cohesion of the viscoelastic composition can be obtained in different ways. One way is to raise the crosslinker concentration, which reduces the processing time. With the crosslinker concentration constant, it is also possible to raise the molecular weight of the polyacrylate, which is possibly more efficient. The abovementioned parameters must be adapted appropriately in accordance with the desired profile of requirements of the composition and/or the product.

Where expanding microballoons are used in the production of foamed layers, the composition or the shaped layer is advantageously activatable in an appropriate manner by introduction of heat. A corona-pretreated polyacrylate layer can then be laminated on, preferably, to both sides of this foamed layer. Advantageously the foamed layer is smoothed by the lamination of the corona-pretreated PSA layers, or separately, by means of rolls, for example.

As a result of the combination of the carrier formulas and adhesive formulas, the adhesive tape of the invention exhibits outstanding properties, of a kind which could not have been foreseen by the skilled worker, and, consequently, the use of the tape is possible in particular as an adhesive assembly tape for high-performance applications. This is also true in particular for its implementation as a self-adhesive tape. The inventive advantages are significant in particular at application temperatures of between 100 and 130° C. Furthermore, on account of the very good anchoring and homogeneous crosslinking, the plasticizer resistance is outstanding. The bond strength on plasticizer-containing substrates remains high even after storage, and the anchoring of the layers to one another remains very good. Delamination of the layers is not observed even following storage against plasticizer-containing substrates.

On account of the high flexibility of the carrier, the adhesive tape conforms very well to uneven substrates. A durable bond is produced between adhesive tape and substrate, and does not fail even under high shearing forces and bending-moment stresses, even at high temperatures and even after storage under UV irradiation and moisture.

An adhesive tape of this kind can be used, for example, in the furniture industry, where mirrors, strips or trim are to be durably bonded. On account of the outstanding properties of the product, its use as an assembly material is also advantageous in many areas of industry, when different surfaces, especially UV-transparent surfaces, such as window glass or transparent plastics, are to be durably bonded to one another.

As a result of the homogeneous crosslinking through the layer, the technical adhesive performance is equally good on each side. With the same adjacent adhesive layers and the same surface structures, the technical adhesive properties of the respective sides are also the same. The viscoelastic carriers do not exhibit any profile of crosslinking through the layer.

With the method of the invention it is possible, furthermore, to offer very thick adhesive tapes. The viscoelastic carrier layer can be particularly thick, since in principle this process is not subject to any limit on layer thickness, in contrast to crosslinking via UV or EBC irradiation. In particular it is also possible to produce filled and foamed viscoelastic layers. In addition, prior to the addition of the thermal crosslinker, it is sensible to add solid glass beads, hollow glass beads or expanding microballoons to the polyacrylate. Where expanding microballoons are used, the composition or the shaped layer is preferably activated in an appropriate way by means of introduction of heat. A corona-pretreated polyacrylate layer can then be laminated on, preferably, on both sides to this foamed layer. Advantageously the foamed layer is smoothed by the lamination of the corona-pretreated adhesive layers or separately, between two rollers, for example.

It is possible to obtain layers colored and filled in any desired way. Moreover, the residual monomer content of the viscoelastic layers, as of the three-layer product as a whole, is very low. A particularly advantageous possibility is that of being able to produce the homogeneously crosslinked viscoelastic acrylate carrier of the three-layer, double-sidedly adhesive-furnished adhesive tape at coating speeds of above 50, preferably 100 m/min.

For certain applications the adhesive tape of the invention, in this case in the form of an intermediate product, can be improved or further adapted to requirements by means of additional irradiation with actinic radiation (UV light or electron beams, for example).

EXAMPLES

The exemplary embodiments which follow are intended to illustrate the invention, without the choice of the examples given being intended to restrict the invention unnecessarily.

Test Methods:

Solids Content:

The solids content is a measure of the fraction of nonvolatiles in a polymer solution. It is determined gravimetrically by weighing the solution, then evaporating the volatile fractions in a drying cabinet at 120° C. for 2 hours, and weighing the residue again.

K Value (According to FIKENTSCHER):

The K value is a measure of the average size of molecules of high-polymer compounds. It is measured by preparing one percent (1 g to 100 ml) toluene solutions of polymer and determining their kinematic viscosities using a VOGEL-OS-SAG viscometer. Standardizing to the viscosity of the toluene gives the relative viscosity, from which the K value can be calculated by the method of FIKENTSCHER (Polymer 8/1967, 381 ff.).

Gel Permeation Chromatography GPC

The average molecular weight $M_w$ and the polydispersity PD were determined by the company Polymer Standards Service at Mainz. The eluent used was THF containing 0.1% by volume trifluoroacetic acid. Measurement was made at 25° C. The precolumn used was of type PSS-SDV, 5µ, $10^3$ Å, ID 8.00 mm×50 mm. Separation was carried out using the columns of type PSS-SDV, 5µ, $10^3$ and also $10^5$ and $10^6$ each of ID 8.0 mm×300 mm. The sample concentration was 4 g/l and the flow rate 1.0 ml per minute. Measurement was made against PMMA standards.

90° Bond Strength to Steel (Open and Lined Sides)

The bond strength to steel is determined under test conditions of 23°+/−1° C. room temperature and 50%+/−5% relative atmospheric humidity. The specimens were cut to a width of 20 mm and adhered to a steel plate. Prior to the measurement, the steel plate must be cleaned and conditioned. For that purpose the plate is first wiped with acetone and then left in the air for 5 minutes to allow the solvent to evaporate. The side of the transfer tape facing away from the test substrate was then lined with a 50 µm aluminum foil, to prevent the specimen stretching in the course of measurement. After that, the test specimen was rolled onto the steel substrate. For that purpose the tape was run over back and forth with a 2 kg roller 5 times, at a rolling speed of 10 m/min. Immediately after this rolling, the steel plate was inserted into a special mount which allows the specimen to be peeled vertically upward at an angle of 90°. The bond strength was measured using a Zwick tensile testing machine. In the case of application of the lined side to the steel plate, the open side of the transfer tape is first laminated against the 50 µm aluminum foil, the release material is removed and the tape is adhered to the steel plate, rolled on in the same way and subjected to measurement.

Holding Power (Open and Lined Sides)

Sample preparation took place under test conditions of 23° C.+/−1° C. room temperature and 50%+/−5% relative atmospheric humidity. The test specimen was cut to 13 mm and adhered to a steel plate. The bond area is 20 mm×13 mm (length×width). Prior to the measurement, the steel plate was cleaned and conditioned. For that purpose the plate is first wiped with acetone and then left in the air for 5 minutes to allow the solvent to evaporate. After bonding, the open side was reinforced with a 50 µm aluminum foil and rolled over twice back and forth with a 2 kg roller. Then a belt loop was attached to the protruding end of the transfer tape. The whole assembly was then suspended from a suitable apparatus and loaded with 10 N. The suspension apparatus is such that the weight loads the sample at an angle of 179°+/−1°. This ensures that the transfer tape cannot peel from the bottom edge of the plate. The measured shear withstand time, the time between suspension of the specimen and its falling off, is reported as holding power in minutes and corresponds to the average value from three measurements. For the measurement of the lined side, the open side is first reinforced with the 50 µm aluminum foil, the release material is removed, and the tape is adhered to the test plate in the same way as described. The measurement is made under standard conditions (23° C., 55% atmospheric humidity).

Rolling Ball Tack (Open and Lined Sides)

The rolling ball test was used to measure the tack of the specimens with a very short contact time. Measurement took place under test conditions of 23° C.+/−1° C. room temperature and 50%+/−5% relative atmospheric humidity. The transfer tape was fixed, with the side under test facing upward, under gentle tension, on the working plate, which was oriented exactly horizontally. Subsequently a ramp 65 mm high was placed on the specimen strip and a clean ball, cleaned with acetone and weighing 5.6 g, was rolled down the ramp. The distance between the leading edge of the ramp and the center point of the rolled ball which has come to rest was measured. The value reported is the average from 5 measurements per side.

SAFT—Shear Adhesive Failure Temperature (Open and Lined Sides)

The SAFT test is an accelerated test of the short-term temperature resistance of the transfer tapes. The specimens were reinforced with a 50 μm aluminum foil and the remaining adhesive side was adhered to a ground steel test plate which had been cleaned with acetone, and then overrolled six times using a 2 kg steel roller at a speed of 10 m/min. The bond area of the sample, height×width, was 13 mm×10 mm. The top part of the specimen, which protrudes beyond the test plate by 2 mm, was reinforced with a shear adhesive strip. At this point, after the sample had been suspended vertically, the travel sensor was applied.

The sample under measurement was loaded at the bottom end with a weight of 50 g. The steel test plate with the bonded sample was then heated, starting at 25° C. and at a rate of 9° C. per minute, to the final temperature of 200° C. Using the travel sensor, the slip travel of the sample was measured as a function of temperature and time. The measurement was ended when the envisaged final temperature was reached or when a slip travel of >1000 μm was attained.

The SAFT test is able to provide two test features: SAFT shear travel or SAFT short-term temperature resistance. The SAFT shear travel is the slip travel in μm when the final temperature is reached. The SAFT short-term temperature resistance is the temperature at which a slip travel of 1000 μm is attained. Both sides are measured: the open side and the lined side. The value reported is in each case the average of a duplicate determination.

Wall Hook Test

Figure 3:
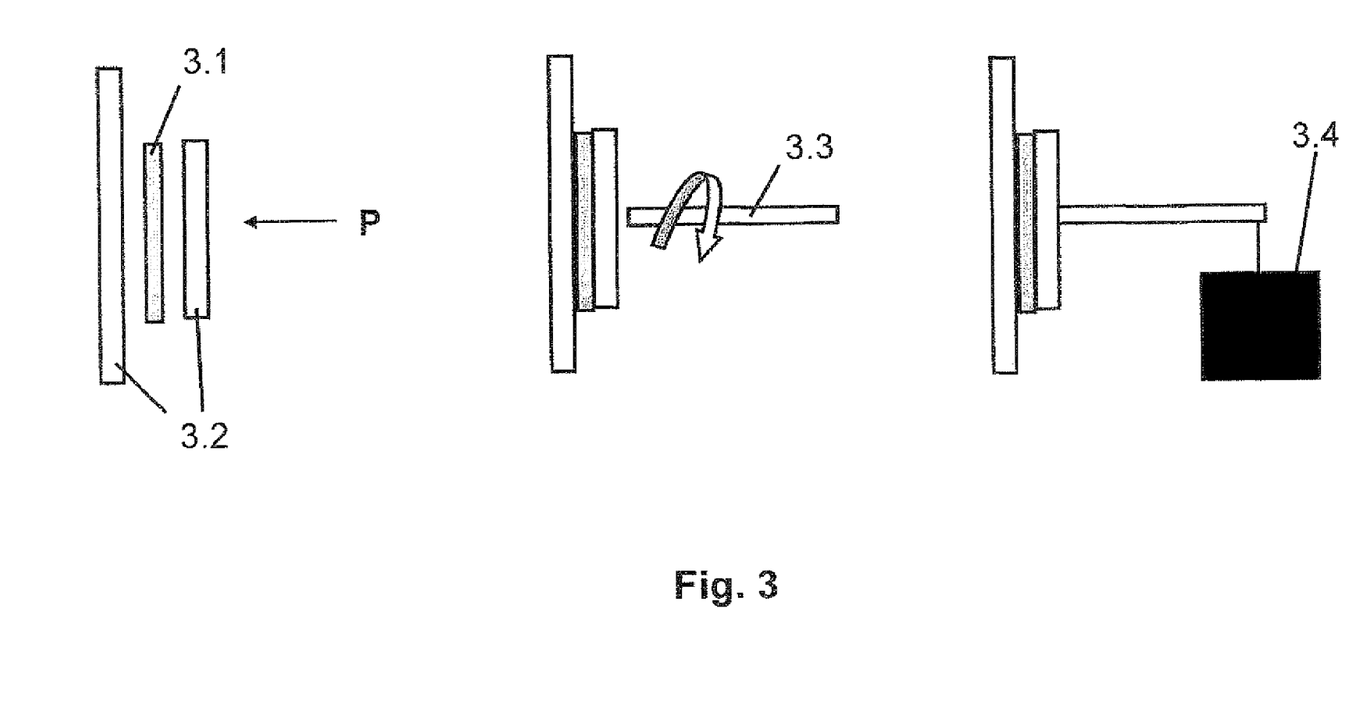
FIG. 3. illustrates a test of the holding power of the adhesive tape of the invention.

FIG. 3 shows the testing of the pressure-sensitive polyacrylate layers (layer A and/or C). A test specimen (3.1) fixed between two polished steel plates (3.2) and measuring 30 mm×30 mm is pressed for 1 minute at 0.9 kN (force P). After that, a lever arm (3.3) 9 cm long is screwed into the top steel plate, which is subsequently loaded with a 1000 g weight (3.4). Care is taken to ensure that the time between pressing and loading is not more than 2 minutes (t≦2 min).

A measurement is made of the holding power, i.e., the time between the suspension of the specimen and its falling off. The result reported is the holding power in minutes, as the average value from a triplicate determination. The test conditions are 23° C.+/−1° C. and 50% rh+/−5% rh (rh=relative humidity).

Measurements were carried out in each case on the open side and the lined side.

Pressure-Sensitive Polyacrylate Adhesive 1 (PA1):

A 100 l glass reactor conventional for free-radical polymerizations was charged with 2.8 kg of acrylic acid, 8.0 kg of methyl acrylate, 29.2 kg of 2-ethylhexyl acrylate and 20.0 kg of acetone/isopropanol (95:5). After nitrogen gas had been passed through the reactor for 45 minutes with stirring, the reactor was heated to 58° C. and 20 g of azoisobutyronitrile (AIBN, Vazo 64®, DuPont) were added. Subsequently the external heating bath was heated to 75° C. and the reaction was carried out constantly at this external temperature. After a reaction time of 1 h a further 20 g of AIBN were added. After 4 h and 8 h the reaction mixture was diluted with 10.0 kg each time of acetone/isopropanol (95:5) mixture. For reduction of the residual initiators, after both 8 h and 10 h, 60 g portions of bis(4-tert-butylcyclohexanyl) peroxycarbonate (Perkadox 16®, Akzo Nobel) were added. The reaction was discontinued after a reaction time of 24 h and the reaction mixture was cooled to room temperature. Subsequently the polyacrylate was blended with 0.4% by weight of aluminum(III) acetylacetonate (3% strength solution, isopropanol), the blend was diluted with isopropanol to a solid contents of 30%, and then coating took place from solution onto a siliconized release film (50 μm polyester). (Coating speed 2.5 m/min, drying tunnel 15 m, temperatures: zone 1: 40° C., zone 2: 70° C., zone 3: 95° C., zone 4: 105° C.). The coatweight was 50 g/m².

Pressure-Sensitive Polyacrylate Adhesive 2 (PA2):

A 100 l steel reactor conventional for free-radical polymerizations was charged with 4.0 kg of acrylic acid, 36.0 kg of 2-ethylhexyl acrylate and 13.3 kg of acetone/isopropanol (96:4). After nitrogen gas had been passed through the reactor for 45 minutes with stirring, the reactor was heated to 58° C. and 20 g of azoisobutyronitrile (AIBN, Vazo 64®, DuPont) were added. Subsequently the external heating bath was heated to 75° C. and the reaction was carried out constantly at this external temperature. After a reaction time of 1 h a further 20 g of AIBN were added. After 4 h and 8 h the reaction mixture was diluted with 10.0 kg each time of acetone/isopropanol (96:4) mixture. For reduction of the residual initiators, after both 8 h and 10 h, 60 g portions of bis(4-tert-butylcyclohexanyl)peroxydicarbonate (Perkadox 16®, Akzo Nobel) were added. The reaction was discontinued after a reaction time of 24 h and the reaction mixture was cooled to room temperature. Subsequently the polyacrylate was blended with 0.4% by weight of aluminum(III) acetylacetonate (3% strength solution, isopropanol), the blend was diluted with isopropanol to a solids content of 30%, and then coating took place from solution onto a siliconized release film (50 μm polyester). After drying (coating speed 2.5 m/min, drying tunnel 15 m, temperatures: zone 1: 40° C., zone 2: 70° C., zone 3: 95° C., zone 4: 105° C.) the coatweight was 50 g/m².

B. Production of the Viscoelastic Carriers

Preparation of the Starting Polymers for the Viscoelastic Carriers of Examples VT 1 to 6

The preparation of the starting polymers is described below. The polymers investigated were prepared conventionally via free-radical polymerization in solution.

HEMA=hydroxyethyl methacrylate
AIBN=2,2'-azobis(2-methylbutyronitrile)
Perkadox 16=bis(4-tert-butylcyclohexyl)peroxydicarbonate Base Polymer 1 (B1)

A reactor conventional for free-radical polymerizations was charged with 27 kg of 2-ethylhexyl acrylate, 27 kg of n-butyl acrylate, 4.8 kg of methyl acrylate, 0.6 kg of acrylic acid, 0.6 kg of HEMA and 40 kg of acetone/isopropanol (93:7). After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After 1 h a further 30 g of AIBN were added and after 4 h the batch was diluted with 10 kg of acetone/isopropanol mixture.

After 5 h and after 7 h, reinitiation was carried out with 90 g of Perkadox 16 each time. After a reaction time of 22 h the polymerization was discontinued and the product was cooled to room temperature. The polyacrylate has a K value of 69, a solids content of 54.6%, an average molecular weight of Mw=819 000 g/mol, and a polydispersity (Mw/Mn)=7.6.

Base Polymer 2 (B2)

In the same way as for example 1, 36.0 kg of 2-ethylhexyl acrylate, 21.0 kg of tert-butyl acrylate, 2.4 kg of acrylic acid and 0.6 kg of HEMA were polymerized in 40 kg of acetone/isopropanol (93:7). Initiation was carried out twice with 30 g of AIBN each time, twice with 90 g of Perkadox 16 each time, and dilution was carried out with 10 kg of acetone/isopropanol mixture (93:7). After a reaction time of 22 h the polymerization was discontinued and the product was cooled to room temperature.

The polyacrylate has a K value of 60.0, a solids content of 53.5%, an average molecular weight of Mw=602 000 g/mol, and a polydispersity (Mw/Mn)=7.1.

Base Polymer 3 (B3)

The same procedure was used as for example 1. For the polymerization, 36 kg of 2-ethylhexyl acrylate, 20.4 kg of methyl acrylate, 2.4 kg of acrylic acid and 1.2 kg of HEMA were polymerized in 40 kg of acetone/isopropanol (90:10). Initiation was carried out twice with 30 g of AIBN each time, twice with 90 g of Perkadox 16 each time, and dilution was carried out with 10 kg of acetone/isopropanol mixture (90:10). After a reaction time of 22 h the polymerization was discontinued and the product was cooled to room temperature.

The polyacrylate has a K value of 57, a solids content of 53.8%, an average molecular weight of Mw=526 000 g/mol, and a polydispersity (Mw/Mn)=6.8.

Base Polymer 4 (B4)

A reactor conventional for free-radical polymerizations was charged with 36 kg of 2-ethylhexyl acrylate, 21 kg of tert-butyl acrylate, 2.4 kg of acrylic acid, 0.6 kg of HEMA, 40 g of benzyl dithiobenzoate and 40 kg of acetone. After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After 1 h a further 30 kg of AIBN were added and after 4 h the batch was diluted with 5 kg of acetone. After 5 h and after 7 h, 90 g portions of Perkadox 16™ (Akzo) were added. After a reaction time of 22 h the polymerization was discontinued and the product was cooled to room temperature. The polyacrylate has a K value of 53.6, a solids content of 54.9%, an average molecular weight of Mw=479 000 g/mol, and a polydispersity (Mw/Mn)=2.4.

Method 1: Concentration of the Base Polymers for the Viscoelastic Carriers:

The acrylate copolymers (base polymer 1-4) functionalized with hydroxyl groups are freed very largely from the solvent by means of a BERSTORFF single-screw extruder (concentrating extruder). The parameters given by way of example here are those for the concentration of base polymer 1. The speed of the screw was 160 rpm, the motor current 16 A, and a throughput of 61.5 kg liquid/h was realized. For concentration, a vacuum was applied at 3 different domes. The reduced pressures were, respectively, 440 mbar, 50 mbar and 5 mbar, the lowest vacuum being applied in the first dome. The exit temperature of the concentrated hotmelt was 104° C. The solids content after this concentration step was 99.8%.

Method 2: Production of the Filler-Modified Viscoelastic Carriers Blending with the Thermal Crosslinker The acrylate polymers concentrated by method 1 were melted in a feeder extruder (single-screw conveying extruder from TROESTER) and using this extruder were conveyed as a polymer melt into a twin-screw extruder (LEISTRITZ, Germany, ref. LSM 30/34). The assembly is heated electrically from the outside and is air cooled by a number of fans. The geometry of the mixing screws was chosen such that effective distribution of the fillers and of the crosslinking system in the polymer matrix is accompanied by the assurance of a short residence time of the acrylate composition in the extruder. For these purposes the mixing screws of the twin-screw extruder were arranged so that conveying elements are in alternation with mixing elements. The addition of the fillers and of the respective crosslinking system takes place with appropriate metering equipment, at two or more sites where appropriate, into the unpressurized conveying zones of the twin-screw extruder. Metering aids are used where appropriate to meter the crosslinking system. It is possible if desired to connect a vacuum pump to the twin-screw extruder in order to free the compounded self-adhesive composition from gas inclusions. The ready-compounded acrylate composition is then supplied, by means of a melt pump downstream of the mixing extruder, to a distributor nozzle, which conveys the viscoelastic carrier into the first roll nip of the coating calender. Coating of the self-adhesive compositions of the invention takes place by means of a two-roll calender in accordance with one of the methods described below.

Method 3 Production of the Three-Layer Constructions by Means of Two-Roll Calender The method was carried out as described in FIG. 2. Using distributor nozzle (1) the viscoelastic composition (3), already compounded with the crosslinking system and, where appropriate, fillers, is supplied to the roll nip. The shaping of the viscoelastic composition to a viscoelastic film takes place between the calender rolls (W1) and (W2) in the roll nip between two self-adhesive compositions (7a, 7b), which in turn are supplied coated onto antiadhesively furnished carrier materials (5a, 5b). In this case there is, simultaneously, shaping of the viscoelastic composition to the set layer thickness, and coating with the two self-adhesive compositions supplied. In order to improve the anchoring of the self-adhesive compositions (7a, 7b) on the shaped viscoelastic carrier layer (4), the self-adhesive compositions, before being fed into the roll nip, are corona-treated by means of corona station (8) (corona unit from VITAPHONE, Denmark, 100 W min/m²). This treatment produces active OH groups on the surface of the self-adhesive compositions, which after the three-layer assembly has been produced lead to improved chemical attachment to the viscoelastic carrier layer. The web speed on passing through the coating unit is 40 m/min.

Downstream of the roll nip, an antiadhesive carrier (5a) is lined where appropriate, and the finished three-layer product (6) is wound up with the remaining second antiadhesive carrier (5b).

Presented below are specific examples relating to the production of the self-adhesive compositions and coating of the adhesive tapes of the invention, without any intention that the invention should be unnecessarily restricted by the choice of specified formulations, configurations, and operational parameters.

Example MT 1

The base polymer B1 was concentrated by method 1 (solids content 99.7%) and then blended by method 2 with 1.6% by weight (based on acrylate copolymer) of the trimerized aliphatic diisocyanates Desmodur XP 2410 (BAYER AG, Germany). To improve its capacity for being metered, the trimerized diisocyanate was diluted 1:3 with the liquid phosphate ester REOFOS 65 (GREAT LAKES, USA). The operational parameters are summarized in table 1. Coating between the composition layers PA 1, which have been coated beforehand onto siliconized polyester films, takes place on the two-roll applicator mechanism at roll temperatures of 10° C. by method 3. The layer thickness of the viscoelastic carrier VT 1 was 825 μm. The corona power was 100 W min/m².

After 7 days' room-temperature storage, the technical adhesive data were measured for both the open and the lined sides. The data of example 1 are summarized in table 2.

Example MT 2

The base polymer B1 was concentrated by method 1 (solids content 99.7%) and then blended in the same way as in example 1 with 0.8% by weight (based on acrylate copolymer) of the trimerized aliphatic diisocyanates Desmodur XP 2410 (BAYER AG, Germany). Subsequently, in the same way as in example 1, coating between composition layers PA 1, which have each been coated beforehand onto siliconized polyester films, takes place on the two-roll applicator mechanism by method 3. The layer thickness of the viscoelastic carrier VT 2 was 800 μm. The corona power was 100 W min/m².

After 7 days' room-temperature storage, the technical adhesive data were measured for both the open and the lined sides. The data of example MT 2 are summarized in table 2.

Example MT 3

The base polymer B1 was concentrated by method 1 (solids content 99.7%) and then Industries) and 2.13% by weight (based on acrylate copolymer) of the hydrophilic aliphatic polyisocyanates Bayhydur VP LS 2150/1 (BAYER AG, Germany). The layers PA 1, which have been coated beforehand onto siliconized polyester films, takes The layer thickness of the viscoelastic carrier VT 3 was 865 μm. The corona power was 100 W min/m².

After 7 days' room-temperature storage, the technical adhesive data were measured for both the open and the lined sides. The data of example MT 3 are summarized in table 2.

Example MT 4

The base polymer B2 was concentrated by method 1 (solids content 99.7%) and then blended by method 2 with 18% by weight of Mikrosöhl chalk (MS40, Söhlde) and 0.19% by weight (based on acrylate copolymer) of the hydrophilic aliphatic polyisocyanates Bayhydur VP LS 2150/1 (BAYER AG, Germany). The operational parameters are summarized in table 1. Coating between the composition layers PA 1, which have been coated beforehand onto siliconized polyester films, takes place on the two-roll applicator viscoelastic carrier VT 4 was 790 μm. The corona power was 100 W min/m².

After 7 days' room-temperature storage, the technical adhesive data were measured for both the open and the lined sides. The data of example MT 4 are summarized in table 2.

Example MT 5

The base polymer B3 was concentrated by method 1 (solids content 99.8%) and then blended by method 2 with 3% by weight of nonexpanded hollow microbeads Expancel 092 DU 40 (Akzo Nobel, Germany) and 1.0% by weight (based on acrylate copolymer) of the trimerized aliphatic diisocyanates Desmodur XP 2410 (BAYER AG, Germany). The operational parameters are summarized in table 1. Heat is introduced to expand the mixture in the extruder, and then coating between the composition layers PA 1, which have been coated beforehand onto siliconized polyester films, takes place at roll temperatures of 130° C. by method 3. The layer thickness of the expanded viscoelastic carrier VT 5 was 740 μm. The corona power for pretreating the pressure-sensitive adhesive layers was 100 W min/m².

After 7 days' room-temperature storage, the technical adhesive data were measured for both the open and the lined sides. The data of example MT 5 are summarized in table 2.

Example MT 6

The base polymer B6 was concentrated by method 1 (solids content 99.8%) and then blended by method 2 with 5% by weight of hydrophobized silica gel Aerosil R 972 (Degussa, Germany) and 1.0% by weight (based on acrylate copolymer) of the trimerized aliphatic diisocyanates Desmodur XP 2410 (BAYER AG, Germany). The operational parameters are summarized in table 1. Coating between the composition layers PA 1, which have been coated beforehand onto siliconized polyester films, subsequently takes place at roll temperatures of 100° C. by method 3. The layer thickness of the viscoelastic carrier VT 6 was 750 μm. The corona power for pretreating the pressure-sensitive adhesive layers was 100 W min/m².

After 7 days' room-temperature storage, the technical adhesive data were measured for both the open and the lined sides. The data of example MT 6 are summarized in table 2.

Example MT 7

In analogy to the production of MT 3, the base polymer B1 was concentrated by method 1 (solids content 99.7%), blended by method 2 with 6.5% by weight of hollow glass beads Q-CEL 5028 (Potters Industries) and 2.13% by weight (based on acrylate copolymer) of the hydrophilic aliphatic polyisocyanates Bayhydur VP LS 2150/1 (BAYER AG, Germany), and coated by method 3 at roll temperatures of 100° C. between the composition layers PA 2, which had been coated beforehand onto siliconized polyester films. The layer thickness of the viscoelastic carrier VT 3 was 865 μm. The corona power for pretreating the pressure-sensitive adhesive layers was 100 W min/m².

After 7 days' room-temperature storage, the technical adhesive data were measured for both the open and the lined sides. The data of example MT 7 are summarized in table 2.

Completely surprising for the skilled worker is the coatability of the hotmelt composition following the addition and incorporation by mixing of the isocyanate crosslinking system into the polyacrylate composition at the temperatures of between 60° C. and 120° C., preferably between 70° C. and 100° C., prevailing within the compounding assembly. By coatability is meant in this context the capacity for the shaping of the crosslinker-blended polyacrylate composition into viscoelastic carrier layers and for its application between corona-pretreated pressure-sensitive adhesives which are in the form of webs and are on release material, this application taking place by means of coating nozzles or roll coating mechanism.

What was expected was a crosslinking or gelling of the viscoelastic carrier composition, so that subsequent application by coating would no longer have been possible. In actual fact, however, the viscoelastic carrier compositions described can be applied by coating within a certain time period after the metered addition of crosslinker, and compounding. The processing time is heavily dependent on molecular weight and hydroxyl functionalization of the polyacrylate composition, and also on the type and amount of the crosslinking system used and the prevailing operational conditions, such as composition temperature and geometry of the compounding assembly, for example.

In accordance with the known prior art, the skilled worker would have expected an immediate reaction of the isocyanates with the OH groups present in the polyacrylate, thereby making the partially crosslinked composition undercoatable. To avoid this, he or she would have had to use blocked isocyanates at extremely high temperatures, with the disadvantage of the blocking agents remaining in the adhesive and causing disruption.

This would severely disrupt the adhesive performance of the adjacent pressure-sensitive adhesive layers.

Nor would the skilled worker have expected that effective aftercrosslinking of the viscoelastic carrier compositions would be possible at room temperature without the controlled influence of actinic radiation, as shown significantly by SAFT and the 10N steel holding power.

As is apparent from the data in the table, the inventively double-sidedly adhesive assembly tapes have very good technical adhesive data. A particular positive is the balanced adhesive profile of the respective sides. With the same layer of adhesive on both sides of the adhesive tape, their technical adhesive data are virtually the same. This shows the homogeneous crosslinking through the layer. This is surprising for the skilled worker. Moreover, these three-layer adhesive tapes do not exhibit any delamination. The anchoring of the layers to one another is very good, as a result of the corona treatment of the pressure-sensitive adhesive layers and the aftercrosslinking of the adjacent viscoelastic carrier layer.

TABLE 1

Viscoelastic carriers

| | | | | Crosslinker incorporation and coating | | | |
|---|---|---|---|---|---|---|---|
| Example | Base polymer Polymer | K value | Fraction of adjuvants [% by weight] | Crosslinker type and amount [% crosslinker based on polymer] | Throughput of composition through TSE [kg/h] | Rotational speed of TSE [1/min] | Setpoint temperature TSE [° C.] |
| VT 1 | B1 | 69 | — | 1.6% XP 2410 | 10 | 100 | 100 |
| VT 2 | B1 | 69 | — | 0.8% XP 2410 | 10 | 100 | 100 |
| VT 3 | B1 | 69 | 6.5% Hollow glass beads Q-CEL 5028 | 2.13% Bayhydur VPLS 2150/1 | 11 | 100 | 80 |
| VT 4 | B2 | 60 | 18% Mikrosöhl MS 40 C160 | 0.19% Bayhydur VP LS 2150/1 | 16 | 150 | 100 |
| VT 5 | B3 | 57 | 3% Expancel 092 DU 40 | 1.0% XP 2410 | 10 | 100 | 125 |
| VT 6 | B4 | 54 | 5% Aerosil R 972 | 1.0% XP 2410 | 10 | 100 | 100 |

| | Crosslinker incorporation and coating | | | | | | |
|---|---|---|---|---|---|---|---|
| Example | Current consumption TSE [A] | Pressure at exit TSE [bar] | Temperature of composition after TSE [° C.] | Coating temperature doctor roll/ coating roll [° C.] | Processing time [min] | Coat-weight [g/m$^2$] | Layer thickness [µm] |
| VT 1 | 12 | 15 | 100 | 100/100 | 10 | 870 | 825 |
| VT 2 | 11 | 15 | 98 | 100/100 | 15 | 840 | 800 |
| VT 3 | 11 | 15 | 98 | 100/100 | 5 | 750 | 865 |
| VT 4 | 19 | 38 | 123 | 100/100 | 15 | 985 | 790 |
| VT 5 | 10 | 28 | 140 | 130/130 | 5 | 375 | 740 |
| VT 6 | 18 | 25 | 100 | 100/100 | 10 | 800 | 750 |

TABLE 2

Product construction and technical adhesive data for the three-layer constructions

| | Three-layer product | | | Total thickness [µm] | Bond strength to steel [N/cm] | | Holding power 10 N 23° C. [min] | | Wall test [min] | | SAFT [µm] | |
|---|---|---|---|---|---|---|---|---|---|---|---|---|
| Example | PSA 1 | Viscoelastic carrier layer | PSA 2 | | Open side | Lined side | Open side | Lined side | Open side | Lined side | Open side | Lined side |
| MT 1 | 50 g/m$^2$ PA 1 | VT 1 | 50 g/m$^2$ PA 1 | 923 | 10.6 | 10.7 | 7300 | 7368 | 5400 | 5300 | 750 µm (200° C.) | 754 µm (200° C.) |
| MT 2 | 50 g/m$^2$ PA 1 | VT 2 | 50 g/m$^2$ PA 1 | 900 | 11.8 | 11.6 | 5328 | 5450 | 3876 | 3860 | 937 µm (200° C.) | 915 µm (200° C.) |

TABLE 2-continued

Product construction and technical adhesive data for the three-layer constructions

| | Three-layer product | | | Total thickness [μm] | Bond strength to steel [N/cm] | | Holding power 10 N 23° C. [min] | | Wall test [min] | | SAFT [μm] | |
|---|---|---|---|---|---|---|---|---|---|---|---|---|
| Example | PSA 1 | Viscoelastic carrier layer | PSA 2 | | Open side | Lined side | Open side | Lined side | Open side | Lined side | Open side | Lined side |
| MT 3 | 50 g/m² PA 1 | VT 3 | 50 g/m² PA 1 | 862 | 8.5 | 8.7 | >20 000 | >20 000 | 9320 | 9360 | 340 μm (200° C.) | 325 μm (200° C.) |
| MT 4 | 50 g/m² PA 1 | VT 4 | 50 g/m² PA 1 | 885 | 10.7 | 10.6 | 15 460 | 15 386 | 7540 | 7468 | 545 μm (200° C.) | 552 μm (200° C.) |
| MT 5 | 50 g/m² PA 1 | VT 5 | 50 g/m² PA 1 | 838 | 13.5 | 13.6 | >20 000 | >20 000 | >10 000 | >10 000 | 795 μm (200° C.) | 801 μm (200° C.) |
| MT 6 | 50 g/m² PA 1 | VT 6 | 50 g/m² PA 1 | 850 | 12.7 | 12.6 | >20 000 | >20 000 | >10 000 | >10 000 | 250 μm (200° C.) | 256 μm (200° C.) |
| MT 7 | 50 g/m² PA 2 | VT 3 | 50 g/m² PA 2 | 964 | 9.5 | 9.4 | >20 000 | >20 000 | >10 000 | >10 000 | 322 μm (200° C.) | 342 μm (200° C.) |

The invention claimed is:

1. A method of producing an adhesive tape having at least one carrier layer and two outer adhesive layers, wherein the carrier layer is from 300 μm to 5000 μm thick and is composed of a photoinitiator-free homogeneously thermally crosslinked polymer based on acrylate and/or methacrylate, in which at least one trimerized isocyanate crosslinker is added in the melt to a polyacrylate copolymer having primary hydroxyl groups and based on acrylic esters and/or methacrylic esters, a layer of the polyacrylate together with the crosslinker is conveyed to a coating unit, where pressure-sensitive adhesive layers are laminated onto both sides of the not-yet fully-crosslinked polyacrylate layer and the crosslinking of the polyacrylate leads to a homogeneously crosslinked carrier layer.

2. The method of claim 1, wherein at least one of the layers is an adhesive layer having hydroxyl functionalities which react with isocyanate groups in the carrier layer.

3. The method of claim 1, wherein at least one of the layers is a barrier layer on whose reverse face, in turn, adhesives have been coated.

4. The method of claim 1, wherein the at least one layer has been physically pretreated.

5. The method of claim 1, wherein the at least one trimerized isocyanate crosslinker is added in an extruder.

6. The method of claim 1, wherein the temperature of the polyacrylate when the trimerized isocyanate crosslinker is added is between 60° C. and 120° C.

7. The method of claim 1, wherein the residual monomer content of the polyacrylate when the crosslinker is added is not more than 1% by weight.

8. The method of claim 1, wherein the primary hydroxyl groups of the polyacrylate are introduced by way of the (meth)acrylic esters, and the fraction of the acrylic esters and/or methacrylic esters containing hydroxyl groups is up to 25% by weight, based on the polyacrylate.

9. The method of claim 1, wherein the polyacrylate is the product of following reactant mixture:
 a1) 65% to 99% by weight of acrylic esters and/or methacrylic esters of the formula $CH_2=C(R^I)(COOR^{II})$ where $R^I$=H or $CH_3$ and $R^{II}$ is an alkyl chain having 1 to 20 carbon atoms,
 a2) 1% to 20% by weight acrylates and/or methacrylates whose alcohol component contains at least one primary hydroxyl group, and/or vinyl compounds which are copolymerizable with acrylates and contain at least one primary hydroxyl group, and
 a3) if the fractions of a1) and a2) do not add up to 100% by weight, 0% to 15% by weight olefinically unsaturated copolymerizable monomers containing functional groups.

10. The method of claim 4, wherein said physical pretreatment is corona treatment.

11. The method of claim 1, wherein said at least one trimerized isocyanate is at least one aliphatic and/or amine-deactivated isocyanate.

12. The method of claim 6, wherein said temperature is between 70° C. and 100° C.

* * * * *